(12) United States Patent
Gershon et al.

(10) Patent No.: US 9,790,602 B2
(45) Date of Patent: Oct. 17, 2017

(54) TECHNIQUES FOR PHOTOCATALYTIC HYDROGEN GENERATION

(71) Applicant: International Business Machines Corporation, Armonk, NY (US)

(72) Inventors: Talia S. Gershon, White Plains, NY (US); Supratik Guha, Chappaqua, NY (US); Teodor K. Todorov, Yorktown Heights, NY (US); Theodore G. van Kessel, Millbrook, NY (US)

(73) Assignee: International Business Machines Corporation, Armonk, NY (US)

( * ) Notice: Subject to any disclaimer, the term of this patent is extended or adjusted under 35 U.S.C. 154(b) by 280 days.

(21) Appl. No.: 14/456,708

(22) Filed: Aug. 11, 2014

(65) Prior Publication Data

US 2016/0040303 A1    Feb. 11, 2016

(51) Int. Cl.
*C25B 1/02* (2006.01)
*B01J 19/12* (2006.01)
(Continued)

(52) U.S. Cl.
CPC ............ *C25B 1/003* (2013.01); *B01J 19/127* (2013.01); *C25B 1/10* (2013.01); *C25B 9/08* (2013.01);
(Continued)

(58) Field of Classification Search
CPC ... C25B 1/003; C25B 9/08; C25B 1/10; B01J 19/127; B01J 2219/00891;
(Continued)

(56) References Cited

U.S. PATENT DOCUMENTS 4,011,149 A * 3/1977 Nozik ................... C25B 1/003
205/340
6,235,417 B1 5/2001 Wachsman et al.
(Continued)

FOREIGN PATENT DOCUMENTS

WO    WO2006002916 A2    1/2006

OTHER PUBLICATIONS

R. McConnell et al., "Generating Hydrogen through Water Electrolysis Using Concentrator Photovoltaics," National Renewable Energy Laboratory, Conference Paper NREL/CP-520-37093 (Jan. 2005).
(Continued)

*Primary Examiner* — Keith Hendricks
*Assistant Examiner* — Colleen M Raphael
(74) *Attorney, Agent, or Firm* — Vazkin Alexanian; Michael J. Chang, LLC

(57) ABSTRACT

Techniques for photocatalytic hydrogen generation are provided. In one aspect, a hydrogen producing cell is provided. The hydrogen producing cell includes an anode electrode; a photocatalytic material adjacent to the anode electrode; a solid electrolyte adjacent to a side of the photocatalytic material opposite the anode electrode; and a cathode electrode adjacent to a side of the solid electrolyte opposite the photocatalytic material. A solar hydrogen producing system including at least one solar concentrating assembly having the hydrogen producing cell, and a method for producing hydrogen using the hydrogen producing cell are also provided.

20 Claims, 3 Drawing Sheets

(51) Int. Cl.
*C25B 9/08* (2006.01)
*C25B 1/10* (2006.01)
*C25B 1/00* (2006.01)

(52) U.S. Cl.
CPC ........ *B01J 2219/00891* (2013.01); *B01J 2219/00943* (2013.01); *B01J 2219/0869* (2013.01); *B01J 2219/0875* (2013.01); *B01J 2219/0892* (2013.01); *Y02E 60/366* (2013.01); *Y02E 70/10* (2013.01)

(58) Field of Classification Search
CPC ........ B01J 2219/0892; B01J 2219/0875; B01J 2219/0869; B01J 2219/00943
USPC .......................................................... 205/340
See application file for complete search history.

(56) References Cited

U.S. PATENT DOCUMENTS

| | | | |
|---|---|---|---|
| 6,468,499 | B1 | 10/2002 | Balachandran et al. |
| 7,682,494 | B2 | 3/2010 | Berland et al. |
| 7,909,979 | B2 | 3/2011 | Yamada et al. |
| 8,475,722 | B2 | 7/2013 | Nakanishi et al. |
| 9,157,155 | B2 * | 10/2015 | Taniguchi ............... C25B 1/003 |
| 2007/0148084 | A1 | 6/2007 | Radhakrishnan et al. |
| 2008/0286625 | A1 * | 11/2008 | Sarkar ................. H01M 4/8825 429/479 |
| 2009/0321244 | A1 | 12/2009 | Smith et al. |
| 2013/0025662 | A1 | 1/2013 | Afzali-Ardakani et al. |
| 2014/0069501 | A1 | 3/2014 | Alabduljabbar et al. |
| 2015/0167179 | A1 * | 6/2015 | Fleig ....................... C25B 1/003 205/340 |

OTHER PUBLICATIONS

T. Lopes et al., "An innovative photoelectrochemical lab device for solar water splitting," Solar Energy Materials and Solar Cells, vol. 128, pp. 399-410 (Jun. 2014).

Liu et al., "Silver nanowire-based transparent, flexible, and conductive thin film," Nanoscale Research Letters, 6:75 (Jan. 2011).

P. Babilo et al., "Enhanced Sintering of Yttrium-Doped Barium Zirconate by Addition of ZnO," J. Am. Ceram. Soc., 88 [9] 2362-2368 (May 2005).

A. D'Epifanio et al., "BaZrxY1-xO3-δ and BaCe1-x-zZrxYzO3-δ Proton Conductors for Intermediate Temperature Solid Oxide Fuel Cells (IT-SOFCs)," ECS Transactions, vol. 7, No. 1, pp. 2337-2342 (Jun. 2007).

A. Fujishima et al., "Titanium dioxide photocatalysis," Journal of Photochemistry and Photobiology C: Photochemistry Reviews, vol. 1, No. 1, pp. 1-21 (Jun. 2000).

* cited by examiner

US 9,790,602 B2

TECHNIQUES FOR PHOTOCATALYTIC HYDROGEN GENERATION

FIELD OF THE INVENTION

The present invention relates to photocatalytic hydrogen generation and more particularly, to an assembly wherein layers of a photoactive material and a solid electrolyte are sandwiched between electrodes that provides a means by which concentrated sunlight can be used to catalyze the splitting of water to produce and isolate hydrogen.

BACKGROUND OF THE INVENTION

One path to short-term storage of solar energy is to use concentrated sunlight to split water, thereby converting solar energy (i.e., photons) into chemical energy in the form of hydrogen ($H_2$) gas. This process is commonly referred to as photo-induced water-splitting. Additional benefits of $H_2$ gas generation may include the use of hydrogen as a fuel for vehicles.

Numerous methods have been proposed to accomplish photo-induced water-splitting. One method focuses on running an electrolysis cell off of a photovoltaic power source. See, for example, R. McConnell et al., "Generating Hydrogen through Water Electrolysis Using Concentrator Photovoltaics," National Renewable Energy Laboratory, Conference Paper NREL/CP-520-37093 (January 2005). Another approach involves electrolysis by immersion of a photovoltaic element in an aqueous solution. See, for example, T. Lopes et al., "An innovative photoelectrochemical lab device for solar water splitting," Solar Energy Materials and Solar Cells, Vol. 128, pgs. 399-410 (June 2014).

These methods however are often inefficient as they compound the efficiency of photovoltaic conversion with the efficiency of the electrolysis process resulting in an overall efficiency that is poor relative to other means of hydrogen generation. Both methods also operate below 100 degrees Celsius (° C.), i.e., in liquid water, and thereby require that all of the energy for catalysis come from visible photons. Further, heat energy that evolves from the portion of incident light that is not photovoltaically converted to electricity is thermodynamically inaccessible.

Accordingly, more efficient techniques are needed for generating hydrogen from sunlight that utilize both incident visible light as well as heat, and thus ultimately result in higher operating efficiencies.

SUMMARY OF THE INVENTION

The present invention provides techniques for photocatalytic hydrogen generation. In one aspect of the invention, a hydrogen producing cell is provided. The hydrogen producing cell includes an anode electrode; a photocatalytic material adjacent to the anode electrode; a solid electrolyte adjacent to a side of the photocatalytic material opposite the anode electrode; and a cathode electrode adjacent to a side of the solid electrolyte opposite the photocatalytic material. According to an exemplary embodiment, the solid electrolyte includes: a first solid electrolyte layer adjacent to a side of the photocatalytic material opposite the anode electrode, wherein the first solid electrolyte layer is porous and permeable to gases; a second solid electrolyte layer adjacent to a side of the first solid electrolyte layer opposite the photocatalytic material, wherein the second solid electrolyte layer is dense and impermeable to gases; and a third solid electrolyte layer adjacent to a side of the second solid electrolyte layer opposite the first solid electrolyte layer, wherein the third solid electrolyte layer is porous and permeable to gases.

In another aspect of the invention, a solar hydrogen producing system is provided. The solar hydrogen producing system includes at least one solar concentrating assembly having i) a solar concentrator optic and ii) a hydrogen producing cell. The hydrogen producing cell includes an anode electrode; a photocatalytic material adjacent to the anode electrode; a solid electrolyte adjacent to a side of the photocatalytic material opposite the anode electrode; and a cathode electrode adjacent to a side of the solid electrolyte opposite the photocatalytic material. The solar concentrator optic is positioned relative to the hydrogen producing cell to direct incident sunlight onto the anode electrode of the hydrogen producing cell.

In yet another aspect of the invention, a method for producing hydrogen is provided. The method includes the steps of: introducing water vapor to a hydrogen producing cell having an anode electrode; a photocatalytic material adjacent to the anode electrode; a solid electrolyte adjacent to a side of the photocatalytic material opposite the anode electrode; and a cathode electrode adjacent to a side of the solid electrolyte opposite the photocatalytic material; directing concentrated sunlight onto the hydrogen producing cell which provides a source of heat and visible radiation to operate the hydrogen producing cell such that electron-hole pairs are generated in the photocatalytic material and used to split the water vapor into hydrogen ions and oxygen gas; applying a potential between the anode electrode and the cathode electrode of the hydrogen producing cell which, via a concentration gradient in the solid electrolyte, transports the hydrogen ions through the solid electrolyte to the cathode electrode; reducing the hydrogen ions to hydrogen gas at the cathode electrode; and extracting the hydrogen gas.

A more complete understanding of the present invention, as well as further features and advantages of the present invention, will be obtained by reference to the following detailed description and drawings.

DETAILED DESCRIPTION OF PREFERRED EMBODIMENTS

Provided herein are techniques for using concentrated sunlight to catalyze the splitting of water to produce and isolate hydrogen, thereby generating a useful fuel from abundant starting materials. The present techniques employ a hydrogen producing cell(s) which generally includes an assembly wherein layers of a photoactive material and a solid electrolyte are sandwiched between (optionally porous) electrodes. During operation, incident sunlight serves as both a source of heat and visible radiation to split water via the photoactive material. Hydrogen ions resulting from the water splitting at the photoactive anode electrode are directed through the solid electrolyte to a cathode electrode, where they are reduced to hydrogen gas for immediate use and/or storage.

Figure 1:
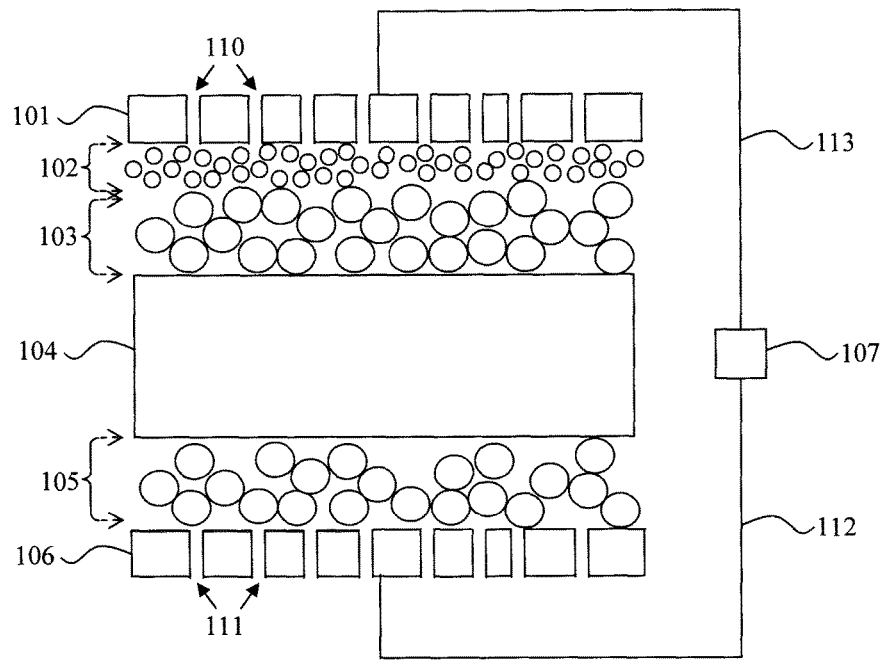
FIG. 1 is a cross-sectional diagram illustrating an exemplary hydrogen producing cell according to an embodiment of the present invention.

The present hydrogen generation cell is now described in detail by way of reference to FIG. 1. As shown in FIG. 1, a hydrogen producing cell 100 according to an exemplary embodiment of the present techniques has a multilayer assembly including a layer of a photocatalytic material 102 and multiple layers of a solid electrolyte, i.e., solid electrolyte 103, 104, and 105 (of varying densities and porosities), sandwiched between electrodes 101 and 106. Specifically, in the exemplary embodiment shown in FIG. 1, hydrogen producing cell 100 includes (anode) electrode 101, photocatalytic material 102 adjacent to electrode 101, (a first) solid electrolyte layer 103 adjacent to a side of the photocatalytic material opposite the electrode 101, (a second) solid electrolyte layer 104 adjacent to a side of solid electrolyte layer 103 opposite the photocatalytic material 102, (a third) solid electrolyte layer 105 adjacent to a side of solid electrolyte layer 104 opposite solid electrolyte layer 103, and (cathode) electrode 106 adjacent to a side of the solid electrolyte layer 105 opposite the solid electrolyte layer 104.

Electrode 101 is a transparent, electrically conductive layer. According to the exemplary embodiment shown in FIG. 1, electrode 101 is a porous (gas permeable) layer. See, for example, gas pores 110 in electrode 101. The porosity of the electrode 101 (and/or that of the photocatalytic material, the electrode 106, and/or the solid electrolyte) enables water vapor to enter the hydrogen producing cell 100 and reaction products including oxygen to exit the hydrogen producing cell 100. Embodiments are also provided herein where the electrode 101 is a dense (gas impermeable) layer. See below. As used throughout the present description, the term "porous" refers to a material that is permeable to gases (e.g., oxygen, hydrogen, water vapor, etc.), and the term "dense" refers to a material that is not-permeable (impermeable) to gases.

According to an exemplary embodiment, electrode 101 serves as an anode of the hydrogen producing cell 100 and electrode 106 serves as a cathode. Like electrode 101, electrode 106 is formed from an electrically conductive material and may be either porous (e.g., as shown in FIG. 1 where electrode 106 has gas pores 111 therein) or dense. Electrode 101 is transparent, allowing a significant fraction of the light (e.g., from about 60 percent (%) to about 100%, and ranges therebetween) entering the hydrogen producing cell 100 to pass into the inner layers of the hydrogen producing cell 100.

According to an exemplary embodiment, electrode 101 is formed from a material including, but not limited to, doped indium oxide (e.g., tin-doped indium oxide or zinc-doped indium oxide), doped tin oxide (e.g., fluorine-doped tin oxide or antimony-doped tin oxide), conductive carbon nanotubes, conductive nanowires (e.g., silver nanowires) and/or combinations including at least one of the foregoing materials. Porous doped indium oxide and doped tin oxide electrodes can be formed by casting the respective particles (i.e., indium-tin-oxide (ITO) particles, indium-zinc-oxide (IZO) particles, fluorine tin oxide (FTO) particles, etc.) from nanoparticle suspensions (e.g., in water) onto a surface using a process such as doctor blading, spray-coating, ink jet printing, or drop casting. By definition, a layer formed in this manner will be porous since space will exist between the cast particles forming the gas pores in the layer. Embodiments are also anticipated herein where the electrode 101 is formed from a dense material which is impermeable to gases. As is known in the art, electrically conductive transparent films such as ITO, IZO, and FTO may be deposited using a physical vapor deposition (PVD) process. The resulting film would be impermeable to gases.

Electrically conductive carbon nanotube films can be prepared by spin-coating or spray-coating from a suspension. The resulting films are porous and transparent. The use of carbon nanotube films as a transparent conducting film is described, for example, in U.S. Patent Application Publication Number 2013/0025662 filed by Afzali-Ardakani et al., entitled "Water Soluble Dopant for Carbon Films," the contents of which are incorporated by reference as if fully set forth herein.

Transparent electrically conductive silver nanowire films are described, for example, in Liu et al., "Silver nanowire-based transparent, flexible, and conductive thin film," Nanoscale Research Letters, 6:75 (January 2011) (hereinafter "Liu"), the contents of which are incorporated by reference as if fully set forth herein. As shown, for example, in FIG. 2 of Liu, silver nanowires form a web-like film which is porous. The film is also transparent.

According to an exemplary embodiment, the hydrogen producing cell 100 is assembled onto a free-standing dense layer of the solid electrolyte, onto which the porous layers of the device are cast. For instance, starting with the dense solid electrolyte 104, the porous solid electrolyte 103 can be formed (e.g., by casting and annealing) on a surface of the dense solid electrolyte 104. The photocatalytic material 102 can be formed (e.g., by casting and annealing) on a surface of the porous solid electrolyte 103 opposite the dense solid electrolyte 104, and so on. The layers of the hydrogen producing cell 100 to the other side of the solid electrolyte 104 can be formed in the same manner beginning on an opposite surface of the dense solid electrolyte 104. Thus, the hydrogen producing cell 100 is not necessarily formed in a sequential manner from the bottom layer up or top layer down. The dense layer of the solid electrolyte is an ideal starting point for constructing the cell since it requires very high annealing temperatures (e.g., from about 1,000° C. to about 1,500° C., and ranges therebetween) which most other materials (including the electrode) could not survive. The dense solid electrolyte also provides a mechanically rigid structure to work with.

In a variant to this exemplary embodiment, the electrode 101 material and the photocatalytic material 102 can be intermixed. For instance, as will be described in detail below, the photocatalytic material 102 may in some cases be formed from porous titanium oxide ($TiO_2$). A layer of porous $TiO_2$ can be attained by casting $TiO_2$ particles onto a surface and then annealing the cast particles to form a solid layer. In this alternative embodiment, the $TiO_2$ particles can be intermixed with the materials used to form the electrode 101 (e.g., ITO particles, IZO particles, FTO particles, carbon nanotubes, nanowires, etc.) and these intermixed materials can be cast and annealed to sinter the cast particles into a combined electrode 101/photocatalytic material 102 layer.

Like electrode 101, the layer of photocatalytic material 102 is either dense or porous. According to an exemplary embodiment, the photocatalytic material 102 is $TiO_2$, tin oxide ($SnO_2$), or tungsten trioxide ($WO_3$). As described above, a layer of porous $TiO_2$ can be attained by casting $TiO_2$ particles and then annealing the cast particles to form a solid layer. The same approach can be used with $SnO_2$ and $WO_3$ particles to form a porous layer. The $TiO_2$ may in some cases be intermixed with the material used in forming the electrode 101 (e.g., ITO particles, IZO particles, FTO particles, carbon nanotubes, nanowires, etc.) such that a combined electrode 101/photocatalytic material 102 layer can be formed. See above. While $TiO_2$, $SnO_2$, and $WO_3$ are given here as exemplary photocatalytic materials, in practice any semiconductor that is stable under the operating conditions described herein (e.g., is stable at the present operating temperatures) may be employed.

In the exemplary embodiment shown illustrated in FIG. 1, the solid electrolyte is made up of three distinct layers 103, 104, and 105, wherein solid electrolyte layer 104 is dense while solid electrolyte layers 103 and 105 are porous. Porous solid electrolyte layer 103 is located adjacent to, and in contact with, photocatalytic material 102. According to an exemplary embodiment, porous solid electrolyte layer 103 is formed from a proton-conducting electrolyte material including, but not limited to, yttrium-doped barium cerium zirconate (BCZY), barium zirconate, barium cerate, yttrium-doped barium zirconate, yttrium-doped barium cerate, and/or combinations including at least one of the foregoing materials. Porous solid electrolyte films can be obtained using the above-described casting and sintering process starting from a precursor powder of the given material. See, for example, P. Babilo et al., "Enhanced Sintering of Yttrium-Doped Barium Zirconate by Addition of ZnO," J. Am. Ceram. Soc., 88 [9] 2362-2368 (May 2005), the contents of which are incorporated by reference as if fully set forth herein. These solid proton-conducting electrolyte materials have an optimal temperature range of from about 400 degrees Celsius (° C.) to about 700° C., and ranges therebetween (i.e., at increased temperatures, oxygen and electronic conduction begins to compete with pure proton conduction). It is notable that while the instant description focuses on a cell having a proton-conducting electrolyte material(s) between the electrodes 101 and 106, other configurations are also possible. By way of example only, the solid electrolyte might instead be configured as an oxygen-conducting membrane. Suitable oxygen-conducting electrolyte materials include, but are not limited to, yttrium doped zirconium oxide. By swapping an oxygen-conducting electrolyte for the proton-conducting counterpart, a selective passage of oxygen (rather than hydrogen) can be obtained through the electrolyte material.

Dense solid electrolyte layer 104 is located adjacent to, and in contact with, porous solid electrolyte layer 103. According to an exemplary embodiment, dense solid electrolyte layer 104 is formed from a proton-conducting electrolyte material including, but not limited to, BCZY, barium zirconate, barium cerate, yttrium-doped barium zirconate, yttrium-doped barium cerate, and/or combinations including at least one of the foregoing materials. To form a dense proton-conducting electrolyte layer, an additional step to press the precursor powder (see above) into a solid form (e.g., using a die) can be performed prior to sintering. The result will be a dense (gas impermeable) electrolyte layer.

Porous solid electrolyte layer 105 is located adjacent to, and in contact with, dense solid electrolyte layer 104. According to an exemplary embodiment, porous solid electrolyte layer 105 is formed from a proton-conducting electrolyte material including, but not limited to, BCZY, barium zirconate, barium cerate, yttrium-doped barium zirconate, yttrium-doped barium cerate, and/or combinations including at least one of the foregoing materials. Porous solid electrolyte layer 105 may be formed in the same manner (e.g., starting with a precursor powder, casting and sintering) as porous solid electrolyte layer 103. The porosity of porous solid electrolyte layer 105 enables hydrogen gas to optionally leave the cell through this layer. Alternate paths for hydrogen gas out of the cell include a porous electrode 101, a porous electrode 106 and/or the porous photocatalytic material 102.

While it is an option to use the same (proton-conducting) electrolyte material for each of the electrolyte layers 103-105, it may also be advantageous to use different materials for different layers. For example, barium zirconate is more stable than barium cerate, although it is not as good at transporting hydrogen ions. There could be a tradeoff to putting the less-stable but better-conductor in the dense layer where there is less surface area for it to degrade and putting the more-stable albeit less conductive barium zirconate layer in the high-surface area porous region.

As will be described in detail below, hydrogen producing cell 100 uses incident sunlight to split water vapor (via the photocatalytic material 102) into its constituent hydrogen and oxygen components. The solid electrolyte serves primarily as a conductor of the hydrogen ions from the (anode) electrode 101 to the (cathode) electrode 106. In its simplest form, the solid electrolyte can in fact consist of just a single layer (such as a single layer of the dense solid electrolyte 104) that serves during operation of the cell to conduct the hydrogen ions generated at the anode to the cathode and to prevent the hydrogen that has passed therethrough from recombining with the oxygen (i.e., the solid electrolyte serves as an isolation barrier). Additionally, as shown in FIG. 1, one or more porous solid electrolyte layers (such as solid electrolyte 103 and/or 105) may be added to increase the effective surface area of the electrolyte and thereby make it more efficient at capturing and containing the generated hydrogen ions and/or to allow gases to enter or leave the cell.

According to an exemplary embodiment, the dense solid electrolyte 104 is used in conjunction with either (i.e., one of) the solid electrolyte 103 or the solid electrolyte 105. An advantage of this configuration is that it permits an increase in the gas flow through the porous electrolyte area and/or an increase in the surface area of the electrolyte (via the porous component) but requires fewer overall processing steps to form the cell as compared to having porous electrolyte on both sides of the dense component.

According to an exemplary embodiment, electrode 106 serves as a cathode of the hydrogen producing cell 100 and electrode 101 serves as an anode. Electrodes 101 and 106 may also be referred to herein as a "working" electrode and a "counter" electrode, respectively. Like electrode 101, electrode 106 is formed from an electrically conductive material and may be either porous (e.g., as shown in FIG. 1 where electrode 106 has gas pores 111 therein) or dense. If the electrode 106 is dense, hydrogen may leave the cell through solid electrolyte layer 105.

According to an exemplary embodiment, electrode 106 is formed from a metal(s) including, but not limited to, platinum (Pt), palladium (Pd), silver (Ag), ruthenium (Ru), nickel (Ni), and/or alloys thereof, such as silver-palladium (Ag—Pd). In that case, hydrogen is reduced at the electrode 106. An electrode 106 formed from Pt, Pd, Ag, Ru, and/or Ni can be dense or porous. Sputtering, evaporation, or other physical vapor deposition (PVD) processes can be used to prepare a dense thin film, whereas simply casting the metal particles from a liquid suspension (see above) will produce a porous electrode. If electrode 106 is porous, hydrogen is both reduced and propagated through the electrode 106 (as well as through the solid electrolyte layer 103, 104, and/or 105).

As shown in FIG. 1, an external circuit 107 electrically connects electrodes 101 and 106 via lines 112 and 113. In its simplest form, the external circuit 107 is a conductor that directly connects the anode (electrode 101) and cathode (electrode 106). According to one exemplary embodiment, the external circuit 107 is a voltage source that is applied to drive the flow of hydrogen ions through the cell via the solid electrolyte in the preferred direction and/or to supply an overpotential to aid in the water splitting reaction.

Overall, hydrogen producing cell 100 uses concentrated sunlight incident on the cell as both a source of heat and visible radiation to split water vapor (via the photocatalytic material 102) into its constituent hydrogen and oxygen components. A potential is applied across electrodes 101 (anode) and 106 (cathode), i.e., via external circuit 107, in order to i) drive hydrogen ions through the solid electrolyte to the electrode 106 (cathode)—where they are reduced to hydrogen gas, and ii) supply an overpotential, which can aid in the electrochemical processes taking place at electrodes 101 and 106.

Figure 2:
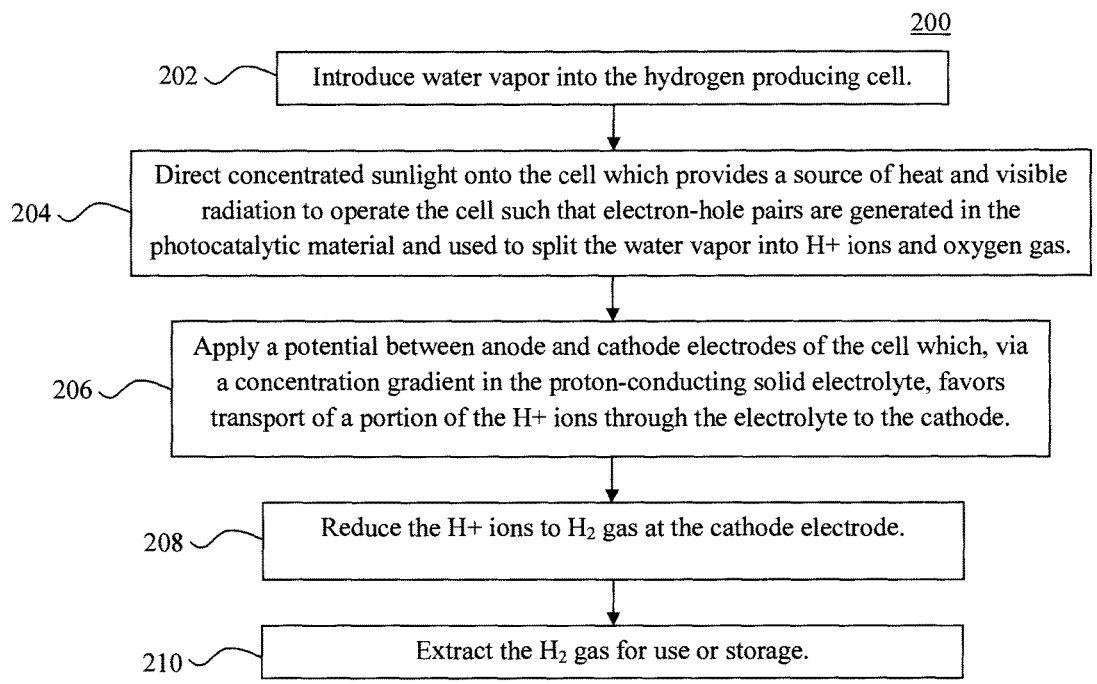
FIG. 2 is a diagram illustrating an exemplary methodology for operating the hydrogen producing cell of FIG. 1 to produce hydrogen according to an embodiment of the present invention.

A more detailed description of the method for operating cell 100 to produce hydrogen gas is now provided by way of reference to methodology 200 of FIG. 2. It is notable that the order in which the steps are presented in FIG. 2 is merely exemplary and the steps may be performed in a different order than shown and/or two or more of the steps shown in FIG. 2 as being separate and distinct may in fact be performed concurrently.

In step 202, water vapor is introduced into the hydrogen producing cell 100. If the electrode 101 is porous (see above), then the water vapor can be introduced into the cell through the (porous) electrode 101. On the other hand, if the electrode 101 is dense (see above), then the water vapor can be introduced into the cell through the (porous) photocatalytic material 102 and/or through the (porous) solid electrolyte 103.

Namely, as provided above, the photocatalytic material 102 can be either porous or dense. When porous, the water vapor can be introduced into the cell via photocatalytic material 102 and/or via the (porous) solid electrolyte 103, and/or via the (optionally porous) electrode 101, or any combination thereof. It is notable that the electrode 101, the photocatalytic material 102, and the solid electrolyte 103 may all be porous, i.e., they are not mutually exclusive. However, if the photocatalytic material 102 is dense, then the water vapor is preferably introduced into the cell through the (porous) solid electrolyte 103. In either case, the water vapor makes contact with the photocatalytic material 102 and the (porous) solid electrolyte 103. Water is split at the surface of the photocatalytic material 102, and hydrogen ions generated by this process diffuse into the (porous) solid electrolyte 103. In general, the sunlight incident on the semiconductor-coated electrode (in this case the photocatalytic material 102-coated electrode 101) generates electron-hole pairs in the photocatalytic material 102 which are then used to oxidize water, thereby evolving oxygen gas and hydrogen ions.

In step 204, sunlight is directed onto the hydrogen producing cell, i.e., onto electrode 101. According to an exemplary embodiment, the present hydrogen producing cell 100 is used in conjunction with a solar concentrating assembly wherein concentrated sunlight enters the cell and heats the electrode 101, the photocatalytic material 102, and the solid electrolyte 103. The heat generated in these layers is then transferred to the rest of the cell and brings the assembly to an operating temperature of from about 400 degrees Celsius (° C.) to about 700° C., and ranges therebetween, e.g., about 600° C. Concurrently, the UV portion of the incident sunlight is absorbed in the photocatalytic material 102 ($TiO_2$ for example has a room-temperature band gap of about 3.2 electron volts (eV), which decreases with increasing temperature). This optical excitation produces electron-hole pairs in the photocatalytic material 102 which migrate to the photocatalytic material surfaces. At the surface of the photocatalytic material (e.g., $TiO_2$, $SnO_2$, or $WO_3$), the water vapor that is introduced into the cell in step 202 is split into oxygen ($O_2$) gas and hydrogen ions (H+ ions). The holes from the photo-generated electron-hole pairs are consumed by the $O_2$ evolution. The electrons are conducted through the photocatalytic material to electrode 101, where they travel through the external circuit 107 to electrode 106.

As provided above, the photocatalytic material 102 may be porous or dense. When porous, the water vapor may be introduced into the cell 100 through the photocatalytic material 102. See above. In that case, the water splitting reaction can occur at any interface between the porous photocatalytic material and the water. Thus, for instance, when the photocatalytic material 102 is formed from cast $TiO_2$, $SnO_2$, or $WO_3$ particles the overall surface area for the water-splitting reaction is great. On the other hand, when the photocatalytic material 102 is a dense layer and the water vapor is introduced to the cell at the (porous) solid electrolyte 103, the interface between the water and the photocatalytic material occurs at the juncture of the photocatalytic material 102 and the solid electrolyte 103. There are benefits and drawbacks to both configurations. While a porous photocatalytic material provides greater surface area for interaction with the water vapor, the H+ ions generated within the photocatalytic layer must travel a distance (albeit small) towards the solid electrolyte. Thus there is the potential for some recombination of the hydrogen ions with the oxygen. On the other hand, a dense photocatalytic material has less surface area but the H+ ions are generated right at the juncture with the solid electrolyte where they can be more readily gathered and conducted to the electrode 106.

A notable advantage of providing concentrated incident sunlight to the cell 100 is that the temperatures achieved (see above) are sufficient to generate water vapor from a liquid water source. Thus, according to an exemplary embodiment, the step (202) of introducing water vapor into the cell 100 involves introducing liquid water into the cell 100 (e.g., via the (optionally porous) electrode, (optionally porous) photocatalytic material 102 and/or the (porous) solid electrolyte 103) and wherein the heat generated by the concentrated sunlight (see above) will serve to generate the water vapor from the liquid water input.

In step 206, a potential is applied (e.g., via external circuit 107) across the electrodes 101 and 106. As provided above, according to an exemplary embodiment, a positive charge is applied to the electrode 101 which serves as an anode (working electrode) and a negative charge is applied to the electrode 106 which serves as a cathode (counter electrode). By way of this potential, a portion of the hydrogen ions (H+ ions) formed at the photocatalytic material 102 (e.g., $TiO_2$, $SnO_2$, or $WO_3$) surface close to solid electrolyte 103 enter the (e.g., proton-conducting) solid electrolyte layer 103. A concentration gradient exists in the electrolyte that favors hydrogen transport in the direction of the electrode 106 on the output side of the cell 100. Additionally, the negative charge applied to electrode 106 exerts an attractive force on the H+ ions.

The hydrogen ions that travel through the solid electrolyte layers 103, 104, and 105 arrive at the cathode electrode 106 and in step 208 are reduced to $H_2$ gas by the electrons traveling through the external circuit 107 and arriving at electrode 106 and/or by the external potential that is supplied. The $H_2$ gas is isolated on this back side of the cell by the dense solid electrolyte layer 104 and therefore may not return to the input side of the cell. See above. In step 210, the hydrogen gas is then extracted for storage or immediate use through the porous solid electrolyte 105 and, if porous, through electrode 106. The oxygen gas may be expelled from the front end of the cell, e.g., from the (optionally porous) electrode 101, from the (optionally porous) photocatalytic material 102, and/or from the porous solid electrolyte 103.

Figure 3:
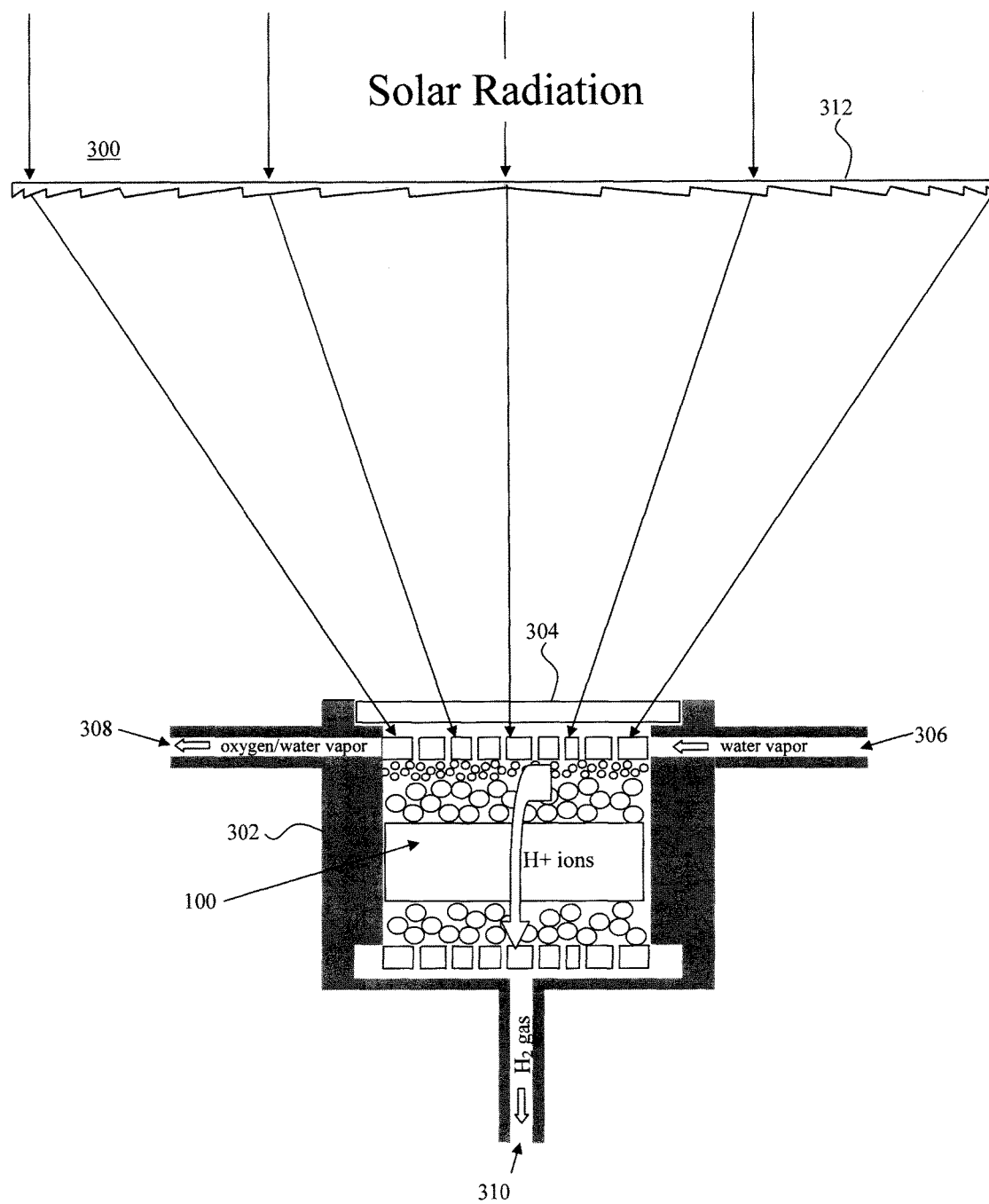
FIG. 3 is a cross-sectional diagram illustrating an exemplary solar concentrating assembly including the hydrogen producing cell of FIG. 1 according to an embodiment of the present invention.
Figure 4:
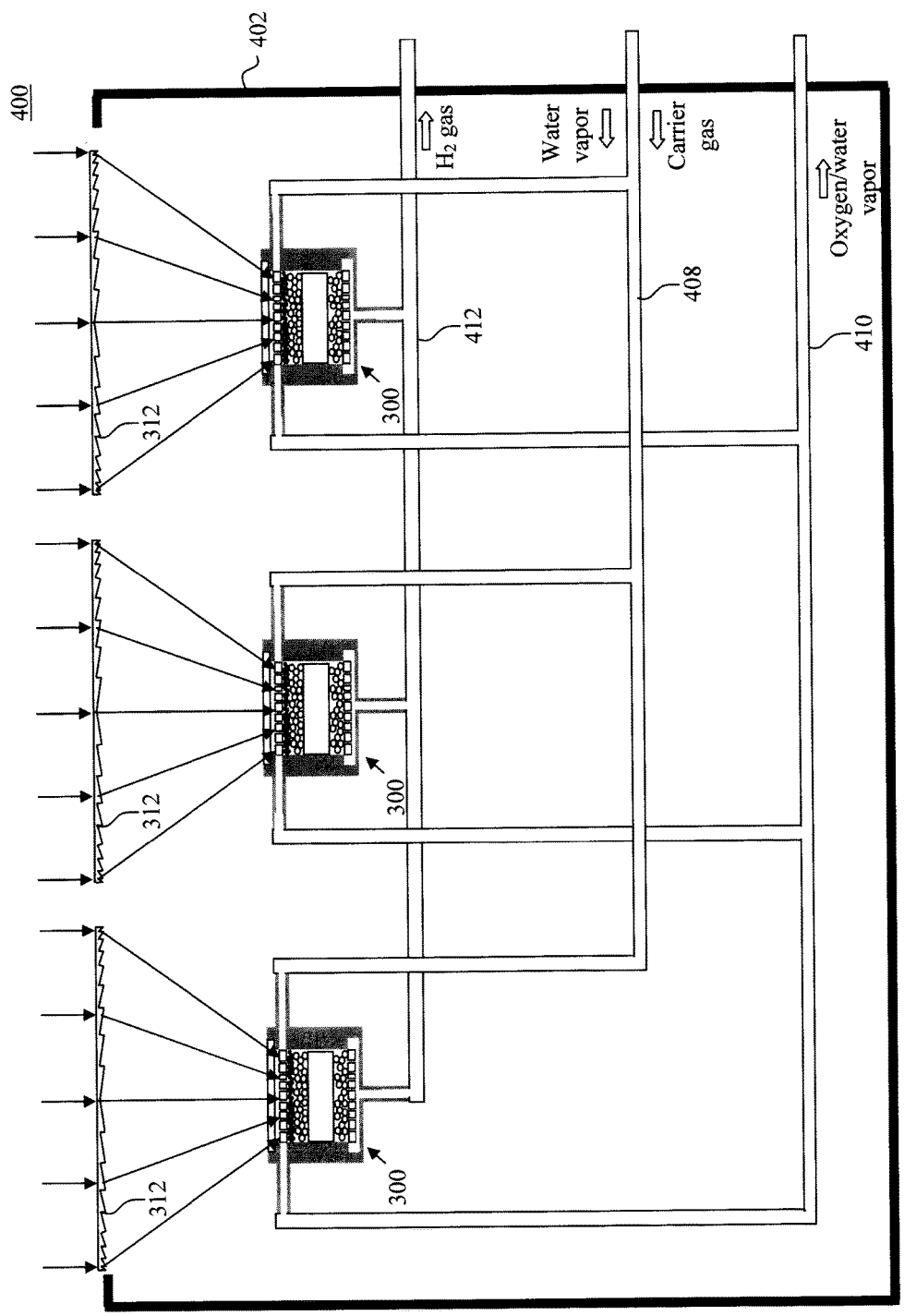
FIG. 4 is a cross-sectional diagram illustrating an exemplary solar hydrogen producing system which includes multiple solar concentrating assemblies of FIG. 3 according to an embodiment of the present invention.

Given the above description, an exemplary embodiment employing the present hydrogen producing cell 100 in a solar concentrating assembly is now provided by way of reference to FIGS. 3 and 4. Specifically, FIG. 3 is a diagram illustrating the present hydrogen producing cell 100 being used within a concentrating solar assembly 300.

As provided above, in addition to providing the visible radiation to operate the cell, the incident sunlight also preferably serves as a source of heat to bring the cell to operating temperatures. In order to reach the operating temperatures provided above, a solar concentrating assembly may be employed. Solar concentrators are described generally in U.S. Patent Application Publication Number 2014/0069501 filed by Alabduljabbar et al., entitled "Cooling System for High Performance Solar Concentrators" (hereinafter "U.S. Patent Application Publication Number 2014/0069501") the contents of which are incorporated by reference as if fully set forth herein.

As shown in FIG. 3, according to an exemplary embodiment, the present hydrogen producing cell 100 is encased in a gas manifold and cell casing 302 fitted with a transparent window 304 adjacent to the electrode 101 of the cell 100. It is notable that for ease and clarity of depiction, the various components of the hydrogen producing cell 100 are not individually labeled in FIG. 3. However, each of these components was described in detail above, is depicted identically in FIG. 3, and will be identified using the same reference numeral in the following description.

According to an exemplary embodiment, the gas manifold and cell casing 302 is formed from a rigid material such as a metal(s), plastic, or glass. The casing must be able to withstand the operating conditions (e.g., operating temperatures) within the cell. It is noted that the depiction in FIG. 3 is that of a cross-sectional cut through the assembly 300. Thus, it is to be understood that the gas manifold and cell casing 302 completely surrounds the hydrogen producing cell 100, limiting access to the cell to the (in this case three) inlet and exhaust ports described below.

Namely, in the exemplary embodiment illustrated in FIG. 3 gas manifold and cell casing 302 has three ports, a water inlet 306 through which water vapor (e.g., steam) or liquid water (see above) can be introduced into the cell, an oxygen/water vapor exhaust 308 through which oxygen gas—a product of the water splitting reaction—and water vapor can be removed, and a hydrogen gas exhaust 310 through which hydrogen ions from the water splitting reaction which have been reduced to hydrogen gas can be collected, e.g., for use and/or storage.

A solar concentrator optic 312 of the assembly 300 serves to focus the incident solar radiation onto the electrode 101. By way of example only, the solar concentrator optic 312 might be a Fresnel lens. As described in detail above and further illustrated in FIG. 3, water vapor is introduced into the cell 100 (in this case via water inlet 306) through (optionally porous) electrode 101, through (optionally porous) photocatalytic material 102, and/or through porous solid electrolyte 103. The incident concentrated sunlight (solar radiation) serves as a heat source to bring the cell 100 to the above-provided operating temperatures and also as a source of visible radiation to generate electron-hole pairs in the photocatalytic material 102 which are used to split the water. A potential between the (anode and cathode) electrodes generated by the external circuit 107 (not shown in FIG. 3) and a concentration gradient throughout the solid electrolyte serves to drive the hydrogen ions (H+ ions) generated by this water splitting reaction through the solid electrolyte (a portion of which—e.g., electrolyte 104—is dense thereby isolating the hydrogen ions) to the cathode electrode 106 where the H+ ions are reduced to hydrogen gas, optionally with the help of an overpotential supplied by the external circuit 107. In this case, the hydrogen gas is collected from the cell 100 via hydrogen exhaust 310 and the oxygen product from the water-splitting reaction is expelled from the cell via the oxygen exhaust 308. It is notable that during operation the oxygen exhaust 308 is likely to contain both water vapor and oxygen. See FIG. 3.

Multiple solar concentrating assemblies 300 (each of which includes the present hydrogen producing cell 100) may be organized into a solar hydrogen producing system 400. See FIG. 4. It is notable that for ease and clarity of depiction, the various components of each of the solar concentrating assemblies 300 are not individually labeled in FIG. 4. However, each of these components was described in detail above, is depicted identically in FIG. 4, and will be identified using the same reference numeral in the following description.

In exemplary solar hydrogen producing system 400 the solar concentrating assemblies 300 are contained within a mechanical enclosure 402 fitted with a solar concentrator optic 312 for each of the assemblies 300. As described in conjunction with the description of FIG. 3, above, the solar concentrator optic 312 serves to focus the incident solar radiation onto the electrode 101 of cell 100. According to an exemplary embodiment, the solar concentrator optic 312 is a Fresnel lens. The enclosure 402 is formed, e.g., from a rigid material such as a metal(s), plastic, or glass. It is noted that the depiction in FIG. 4 is that of a cross-sectional cut through the system 400. Thus, it is to be understood that the enclosure 402 completely surrounds the solar concentrating assemblies 300.

As provided above, according to the present techniques incident sunlight provides both a source of heat and visible radiation to operate the cell(s). Thus, in addition to generating heat, the light provided to each of the hydrogen producing cells 100 needs to be at a wavelength absorbed by the photoactive material (i.e., the photon energy must exceed the band gap energy of the semiconductor material). Incident sunlight (e.g., concentrated through optics such as a Fresnel lens) will serve this purpose. Light that is not absorbed can contribute to the heat (i.e., to achieve and/or maintain operating temperatures).

According to an exemplary embodiment, the solar hydrogen producing system 400 is placed on a solar tracking mechanism (not shown) to point at the sun such that the concentrated light is brought to focus on the individual solar concentrating assemblies 300 during daylight hours. An exemplary two-axis drive system which may be implemented in accordance with the present techniques is described, for example, in U.S. Patent Application Publication Number 2014/0069501. Specifically, as shown in FIG. 6 of U.S. Patent Application Publication Number 2014/0069501 a pedestal (to which the present solar hydrogen producing system 400 can be mounted) can be rotated along a first and a second axis permitting the system to be pointed in two dimensions to follow movement of the sun.

In the exemplary configuration shown in FIG. 4, the specific inlet and exhaust ports from the individual cells in the system are tied together thus permitting collective introduction and extraction of reactants and reaction products. Specifically, as shown in FIG. 4, water vapor is delivered collectively to the water inlets 306 of each of the cells in the system through line 408, oxygen gas produced by the cells is collectively removed from the oxygen exhaust 308 of each of the cells in the system through line 410, and hydrogen gas produced by the cells is collectively removed from the hydrogen gas exhausts 310 of each of the cells in the system through line 412. As provided above, liquid water can be delivered to the cells and converted to water vapor (steam) using the heat generated in the cells, or alternatively, steam itself can be delivered to the cells. In the latter case, any suitable conventional means for producing and delivering (pumping) steam may be employed. In order to insure that the products are being introduced/removed from the system (so as to maintain a concentration gradient), a carrier gas may be used to deliver the water vapor and to flush the oxygen and hydrogen out of the system. Suitable carrier gases include, but are not limited to, helium, nitrogen, and argon. Again, any suitable conventional means for delivering (pumping) the carrier gas may be employed.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A hydrogen producing cell, comprising:
   an anode electrode;
   a photocatalytic material adjacent to the anode electrode;
   a solid electrolyte adjacent to a side of the photocatalytic material opposite the anode electrode, wherein the solid electrolyte comprises multiple layers of varying density and porosity; and
   a cathode electrode adjacent to a side of the solid electrolyte opposite the photocatalytic material, wherein the cathode electrode, the solid electrolyte, the photocatalytic material, and the anode electrode are configured as a stack of layers disposed one on top of another with the photocatalytic material separating the solid electrolyte from the anode electrode.

2. The hydrogen producing cell of claim 1, wherein the photocatalytic material comprises titanium oxide, tin oxide, or tungsten trioxide.

3. The hydrogen producing cell of claim 1, wherein the photocatalytic material is porous and permeable to gases.

4. The hydrogen producing cell of claim 1, wherein the photocatalytic material is dense and impermeable to gases.

5. The hydrogen producing cell of claim 1, wherein the solid electrolyte is formed from a proton-conducting electrolyte material selected from the group consisting of: yttrium-doped barium cerium zirconate (BCZY), barium zirconate, barium cerate, yttrium-doped barium zirconate, yttrium-doped barium cerate, and combinations comprising at least one of the foregoing materials, and wherein the solid electrolyte is dense and impermeable to gases.

6. The hydrogen producing cell of claim 1, wherein the solid electrolyte comprises:

a first solid electrolyte layer adjacent to a side of the photocatalytic material opposite the anode electrode, wherein the first solid electrolyte layer is porous and permeable to gases;
a second solid electrolyte layer adjacent to a side of the first solid electrolyte layer opposite the photocatalytic material, wherein the second solid electrolyte layer is dense and impermeable to gases; and
a third solid electrolyte layer adjacent to a side of the second solid electrolyte layer opposite the first solid electrolyte layer, wherein the third solid electrolyte layer is porous and permeable to gases.

7. The hydrogen producing cell of claim 6, wherein the first solid electrolyte layer, the second solid electrolyte layer, and the third solid electrolyte layer are each formed from a proton-conducting electrolyte material selected from the group consisting of: BCZY, barium zirconate, barium cerate, yttrium-doped barium zirconate, yttrium-doped barium cerate, and combinations comprising at least one of the foregoing materials.

8. The hydrogen producing cell of claim 1, wherein the anode electrode is formed from a material selected from the group consisting of: doped indium oxide, doped tin oxide, conductive carbon nanotubes, conductive nanowires, and combinations comprising at least one of the foregoing materials.

9. The hydrogen producing cell of claim 1, wherein at least one of the anode electrode and the cathode electrode is porous and permeable to gases.

10. The hydrogen producing cell of claim 1, wherein at least one of the anode electrode and the cathode electrode is dense and impermeable to gases.

11. The hydrogen producing cell of claim 1, wherein the cathode electrode is formed from at least one metal selected from the group consisting of: platinum, palladium, silver, ruthenium, nickel, and combinations comprising at least one of the foregoing metals.

12. The hydrogen producing cell of claim 1, further comprising:
   an external circuit comprising a voltage source connected to both the anode electrode and the cathode electrode.

13. A solar hydrogen producing system, comprising:
   at least one solar concentrating assembly having i) a solar concentrator optic and ii) a hydrogen producing cell, wherein the hydrogen producing cell comprises an anode electrode, a photocatalytic material adjacent to the anode electrode, a solid electrolyte adjacent to a side of the photocatalytic material opposite the anode electrode, wherein the solid electrolyte comprises multiple layers of varying density and porosity, and a cathode electrode adjacent to a side of the solid electrolyte opposite the photocatalytic material, wherein the cathode electrode, the solid electrolyte, the photocatalytic material, and the anode electrode are configured as a stack of layers disposed one on top of another with the photocatalytic material separating the solid electrolyte from the anode electrode, and
   wherein the solar concentrator optic is positioned relative to the hydrogen producing cell to direct incident sunlight onto the anode electrode of the hydrogen producing cell.

14. The solar hydrogen producing system of claim 13, further comprising:
   a casing enclosing the hydrogen producing cell.

15. The solar hydrogen producing system of claim 14, wherein the casing comprises:

a water inlet for introducing water vapor into the hydrogen producing cell;
an oxygen exhaust for removing oxygen from the hydrogen producing cell; and
a hydrogen gas exhaust for collecting hydrogen gas from the hydrogen producing cell.

16. The solar hydrogen producing system of claim 13, wherein the solid electrolyte comprises:
a first solid electrolyte layer adjacent to a side of the photocatalytic material opposite the anode electrode, wherein the first solid electrolyte layer is porous and permeable to gases;
a second solid electrolyte layer adjacent to a side of the first solid electrolyte layer opposite the photocatalytic material, wherein the second solid electrolyte layer is dense and impermeable to gases; and
a third solid electrolyte layer adjacent to a side of the second solid electrolyte layer opposite the first solid electrolyte layer, wherein the third solid electrolyte layer is porous and permeable to gases.

17. The solar hydrogen producing system of claim 16, wherein the first solid electrolyte layer, the second solid electrolyte layer, and the third solid electrolyte layer are each formed from a proton-conducting electrolyte material selected from the group consisting of: BCZY, barium zirconate, barium cerate, yttrium-doped barium zirconate, yttrium-doped barium cerate, and combinations comprising at least one of the foregoing materials.

18. A method for producing hydrogen, the method comprising the steps of:
introducing water vapor to a hydrogen producing cell having an anode electrode, a photocatalytic material adjacent to the anode electrode, a solid electrolyte adjacent to a side of the photocatalytic material opposite the anode electrode, wherein the solid electrolyte comprises multiple layers of varying density and porosity, and a cathode electrode adjacent to a side of the solid electrolyte opposite the photocatalytic material, wherein the cathode electrode, the solid electrolyte, the photocatalytic material, and the anode electrode are configured as a stack of layers disposed one on top of another with the photocatalytic material separating the solid electrolyte from the anode electrode;
directing concentrated sunlight onto the hydrogen producing cell which provides a source of heat and visible radiation to operate the hydrogen producing cell such that electron-hole pairs are generated in the photocatalytic material and used to split the water vapor into hydrogen ions and oxygen gas;
applying a potential between the anode electrode and the cathode electrode of the hydrogen producing cell which, via a concentration gradient in the solid electrolyte, transports the hydrogen ions through the solid electrolyte to the cathode electrode;
reducing the hydrogen ions to hydrogen gas at the cathode electrode; and
extracting the hydrogen gas.

19. The method of claim 18, wherein the water vapor is introduced into the hydrogen producing cell via one or more of the anode electrode, the photocatalytic material, and the solid electrolyte.

20. The method of claim 18, further comprising the step of:
heating the hydrogen producing cell to an operating temperature of from about 400° C. to about 700° C., and ranges therebetween, using the concentrated sunlight.

* * * * *